(12) United States Patent
Dry et al.

(10) Patent No.: US 10,343,562 B2
(45) Date of Patent: Jul. 9, 2019

(54) COLLAPSIBLE STORAGE ENCLOSURE FOR VEHICLE

(71) Applicant: Ford Global Technologies, LLC, Dearborn, MI (US)

(72) Inventors: Alan George Dry, Grosse Pointe Woods, MI (US); Marcos Silva Kondrad, Macomb Township, MI (US); Kevin Wayne Preuss, Berkley, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/660,487

(22) Filed: Jul. 26, 2017

(65) Prior Publication Data

US 2019/0031053 A1  Jan. 31, 2019

(51) Int. Cl.
*B60N 2/32* (2006.01)
*B60R 7/04* (2006.01)
*B60N 2/02* (2006.01)

(52) U.S. Cl.
CPC ............ *B60N 2/32* (2013.01); *B60N 2/0292* (2013.01); *B60R 7/043* (2013.01)

(58) Field of Classification Search
CPC ........ B60R 7/043; B60N 2/32; B60N 2/0292; B60N 2/36; B60N 2002/363
USPC ................................................... 296/37.15
See application file for complete search history.

(56) References Cited

U.S. PATENT DOCUMENTS

| 6,540,279 B1* | 4/2003 | Bargiel ................. B60R 7/043 296/37.15 |
| 6,752,443 B1* | 6/2004 | Thompson ............... B60N 2/30 296/24.34 |
| 6,837,531 B2* | 1/2005 | Mack ................... B60N 2/3015 296/190.02 |
| 7,300,088 B1* | 11/2007 | Catenacci ............ B60N 2/3047 296/37.14 |
| 7,341,301 B1* | 3/2008 | Schambre ............... B60R 7/043 224/275 |
| 7,677,655 B2* | 3/2010 | Marsh ................... B60N 2/3011 296/37.5 |
| 8,573,670 B2 | 11/2013 | Zekavica et al. |
| 9,016,749 B2* | 4/2015 | Mueller ................ B60R 5/006 296/37.14 |
| 9,126,538 B1* | 9/2015 | Day ........................ B60R 7/043 |
| 9,840,176 B1* | 12/2017 | Hansen .................. B60N 3/001 |
| 2004/0245797 A1* | 12/2004 | Bixby .................. B60N 2/3045 296/37.15 |
| 2008/0093874 A1* | 4/2008 | Partch .................... B60N 2/305 296/37.15 |
| 2011/0233951 A1 | 9/2011 | Zekavica et al. |

(Continued)

*Primary Examiner* — Gregory A Blaneknship
(74) *Attorney, Agent, or Firm* — Vichit Chea; Price Heneveld LLP

(57) ABSTRACT

A vehicle comprises a seating assembly attached to a floor having a seat that is rotationally operable relative to a seatback. A collapsible assembly is attached to the floor and the seat. When the seat is pivoted upright to a stadium position, the collapsible assembly is selectively deployable from a collapsed configuration to a cargo storage configuration. The cargo storage configuration defines a rigid enclosure at least partially defined by the seat and the floor.

20 Claims, 18 Drawing Sheets

(56) References Cited

U.S. PATENT DOCUMENTS

2016/0200258 A1\* 7/2016 Chawlk .................. B60R 7/043
                                                                                                                        296/37.14
2017/0106773 A1\* 4/2017 Aguilar Ruelas ........ B60N 2/32

\* cited by examiner

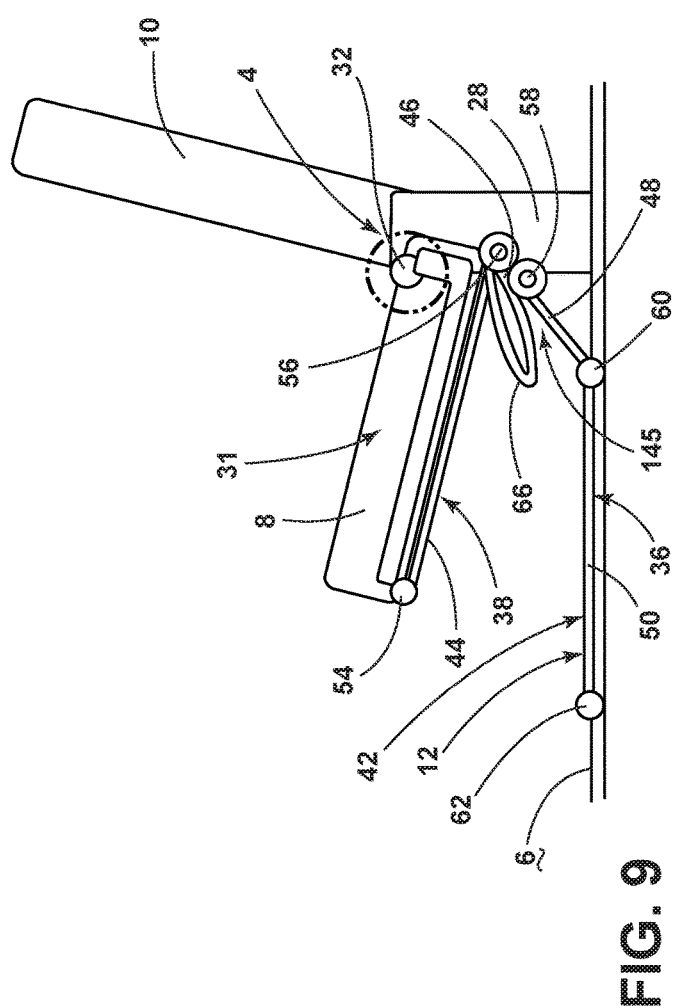
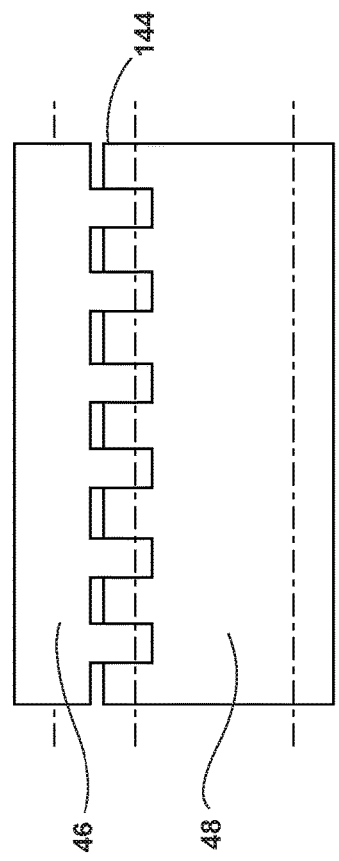
FIG. 9
FIG. 10

COLLAPSIBLE STORAGE ENCLOSURE FOR VEHICLE

FIELD OF THE DISCLOSURE

The present disclosure generally relates to collapsible storage enclosures and, more specifically, to collapsible storage enclosures in vehicles.

BACKGROUND OF THE DISCLOSURE

Storage areas in vehicles have become increasingly important as users seek efficient use of vehicle space. Selectively implementable storage options in a vehicle provide multifunctional vehicle space for changing user needs. Further, it is desirable to provide storage options for vehicle cargo that contain the cargo during vehicle collisions and erratic driving.

SUMMARY OF THE DISCLOSURE

According to one aspect of the present disclosure, a vehicle includes a seating assembly attached to a floor and having a seat that is rotationally operable relative to a seatback. The vehicle also includes a collapsible assembly attached to the floor and the seat. When the seat is pivoted upright to a stadium position, the collapsible assembly is selectively deployable from a collapsed configuration to a cargo storage configuration that defines a rigid enclosure at least partially defined by the seat and the floor.

Aspects of the first aspect of the disclosure can include any one or a combination of the following features:
  the collapsible assembly is selectively collapsible from a cargo storage configuration to a collapsed configuration;
  the rigid enclosure is cuboidal;
  the rigid enclosure is further defined by at least one of a vehicle door and an adjacent vehicle seat;
  the rigid enclosure is accessible via a vehicle door;
  the collapsible assembly comprises a linkage system having a plurality of panel members;
  when the seat is pivoted substantially horizontally in a seating position at least a portion of the collapsible assembly is stowable between the seat and the floor;
  the collapsible assembly is selectively detachable from the seat and the floor;
  an actuator for at least one of deploying and collapsing the collapsible assembly;
  the deploying of the collapsible assembly is biased toward the collapsed configuration; and/or
  detents that maintain the collapsible assembly in the cargo storage configuration.

According to another aspect of the present disclosure, the seating assembly comprises a seat and seatback that are coupled to a floor. A collapsible assembly is coupled to the seat and the floor. The collapsible assembly is selectively deployable from a collapsed configuration to a cargo storage configuration that defines an enclosure at least partially defined by the seat and the floor.

Aspects of the second aspect of the disclosure can include any one or a combination of the following features:
  the seat is in a substantially vertical position;
  the enclosure has a cuboidal shape; and/or
  the collapsible assembly comprises a linkage system having a plurality of panel members.

According to yet another aspect of the present disclosure, a storage system includes a seating assembly including a seat, a seatback, a floor, and a collapsible assembly. The seating assembly is coupled to the floor. The collapsible assembly is coupled to the seat and the floor. The storage system is selectively arrangable in at least one of: inoperable, operable, and fully-formed configurations.

Aspects of the third aspect of the disclosure can include any one or a combination of the following features:
  an inoperable configuration includes the seat in a substantially horizontal position;
  the operable and fully-formed configurations include the seat in a substantially vertical position;
  the fully-formed configuration includes an enclosure defined by at least the collapsible assembly, the seat, and the floor; and/or
  detents that maintain the fully-formed configuration.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 9 is a schematic sectional view of the collapsible assembly in the inoperable configuration under the horizontal seat of an aspect of the present disclosure;

FIG. 10 is a plan view of the interface between the second panel and the third panel at the third hinge of FIG. 9;

DETAILED DESCRIPTION

Figure 1:
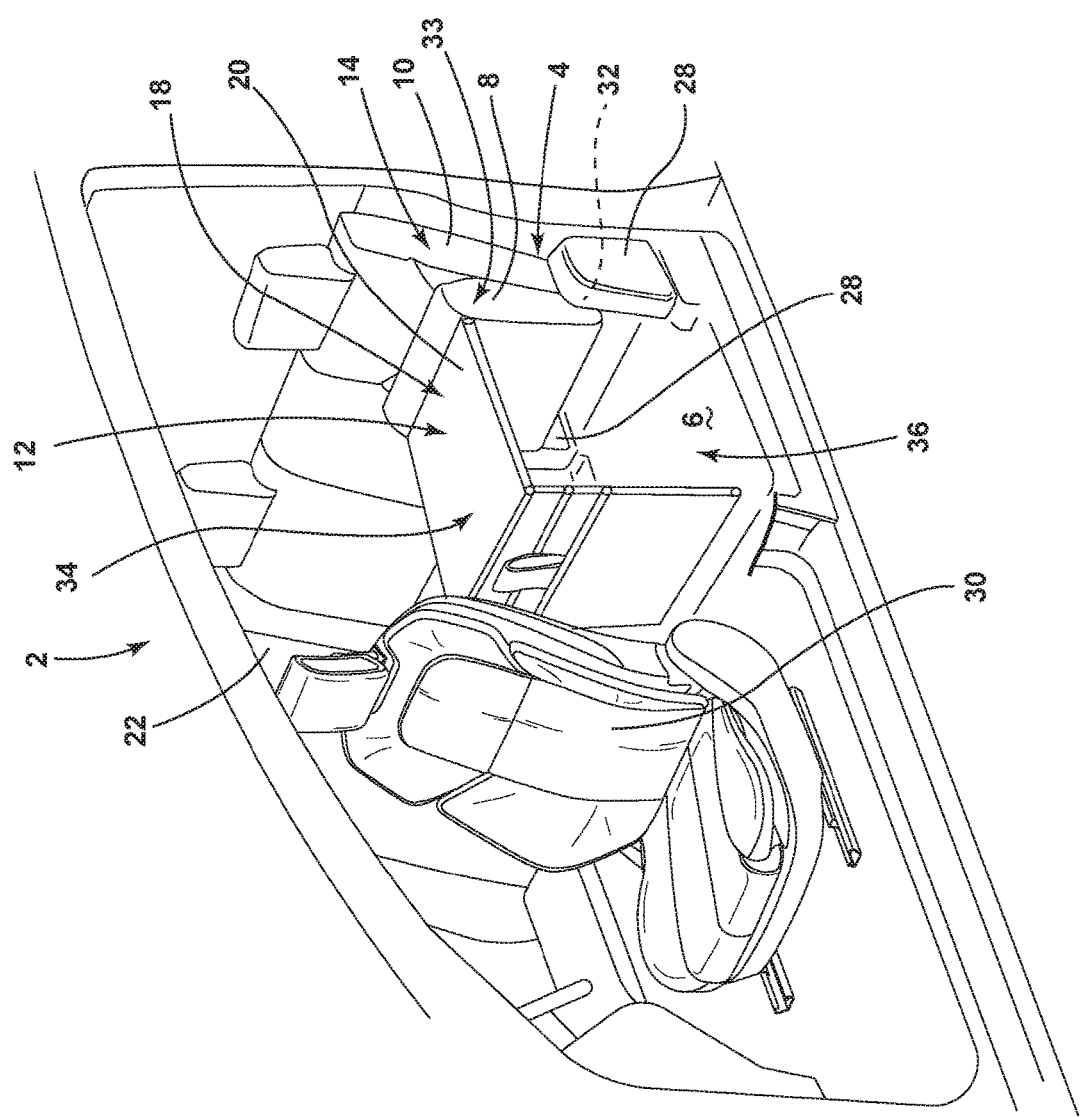
FIG. 1 is a perspective view of a vehicle interior with the collapsible assembly in a cargo storage configuration of an aspect of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary aspects of the inventive concepts defined in the appended claims. Hence, specific dimensions and other physical characteristics relating to the aspects disclosed herein are not to be considered as limiting, unless the claims expressly state otherwise.

Referring to FIGS. 1-19, a vehicle 2 includes a seating assembly 4 attached to a floor 6 having a seat 8 that is rotationally operable relative to a seatback 10. The vehicle 2 also includes a collapsible assembly 12 attached to the floor 6 and the seat 8. When the seat 8 is pivoted upright to a stadium position 14, the collapsible assembly 12 is selectively deployable from a collapsed configuration 16 to a cargo storage configuration 18 that defines a rigid enclosure 20 at least partially defined by the seat 8 and the floor 6.

Figure 6:
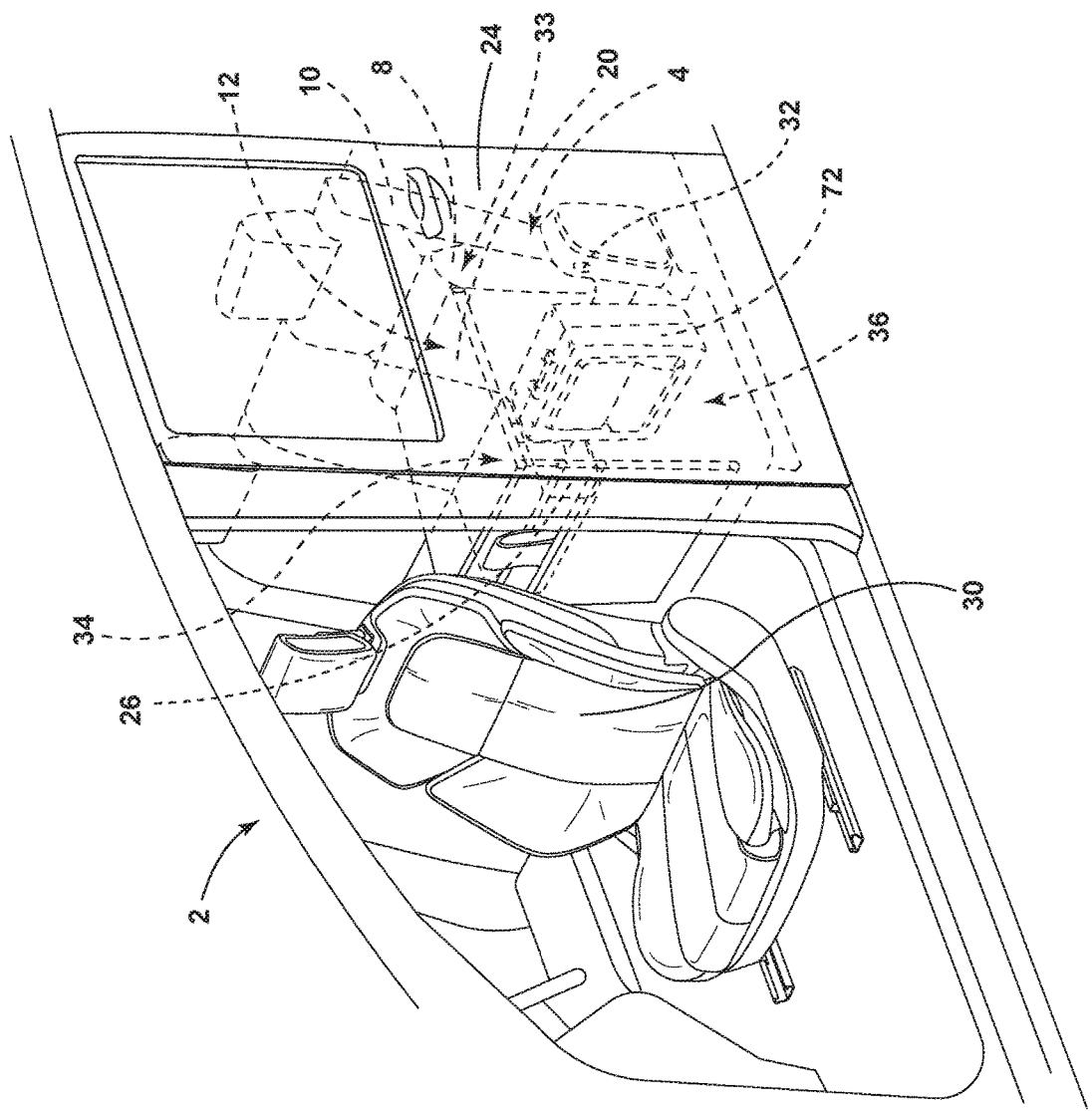
FIG. 6 is a perspective view of an aspect of the collapsible assembly of FIG. 5 in a cargo storage configuration bordered by the adjacent seat and the door of an aspect of the present disclosure.

Referring to FIG. 1, the collapsible assembly 12 is illustrated inside a cabin 22 of a vehicle 2. The collapsible assembly 12 is shown in the cargo storage configuration 18. In the depicted aspect, the collapsible assembly 12 operates to form a rigid enclosure 20 in combination with the seat 8 and the floor 6. Referring to FIG. 6, in the depicted aspect, the rigid enclosure 20 is further defined by a driver side passenger door 24 and an adjacent vehicle seat 26. Referring to FIG. 1, the seating assembly 4 is coupled to the floor 6 at the pedestal 28. In various aspects, the pedestal 28 may be part of the seating assembly 4. In various aspects, the pedestal 28 may not be part of the seating assembly 4.

Referring to FIG. 1, in the depicted aspect, the seating assembly 4 with collapsible assembly 12 is located behind the driver's seat 30. Referring to FIGS. 1 and 6, the collapsible assembly's 12 location behind the driver's seat 30 allows for convenient access to the rigid enclosure 20 from the driver side passenger door 24. In the depicted aspect, it is convenient for a user to load luggage into the rigid enclosure 20 when the driver side passenger door 24 is opened. The seating assembly 4 includes a pivot 32 that allows the seat 8 and the seatback 10 to be rotationally coupled to one another so that the seat 8 can be raised from a substantially horizontal position 31 to a substantially vertical position 33 to deploy the collapsible assembly 12. Referring to FIGS. 1 and 6, it is therefore convenient for a user to open the driver side passenger door 24, raise the seat 8 to a substantially vertical position 33, deploy the collapsible assembly 12 to a fully-formed configuration 34, and place luggage into the fully-formed configuration 34, which is a rigid enclosure 20 in the depicted aspect.

In certain conditions, when it is desirable to have luggage stored in a secure enclosure, it may be convenient to use the collapsible assembly 12. Users may not want their luggage to move within the vehicle 2 during erratic driving or collisions. Further, users may want to conceal their luggage from the view of others. Accordingly, providing a collapsible assembly 12, that is selectively deployable to a rigid enclosure 20 as generally set forth in FIGS. 1-19, readily provides a selectively operable secure enclosure for luggage and other cargo, thus providing for a more pleasant traveling experience for the occupant.

Thus, in FIG. 1, a vehicle 2 with a fully-formed rigid enclosure 20 for cargo storage is shown. The rigid enclosure 20 in the depicted aspect is cuboidal. The seating assembly 4 is arranged such that the seatback 10 and the seat 8 are in the stadium position 14.

The collapsible assembly 12 is part of a vehicle storage system 36. The vehicle storage system 36 includes: the seating assembly 4 including the seat 8 and the seatback 10, the floor 6, and the collapsible assembly 12. In the depicted aspect, the seating assembly 4 can be coupled directly to the floor 6 or can be coupled to the floor 6 at the pedestal 28, and the collapsible assembly 12 is coupled to the seat 8 and the floor 6.

The vehicle storage system 36 may be arranged in the following configurations: inoperable, operable, and fully-formed. The vehicle storage system 36 depicted in FIGS. 2, 9, 11, and 18 is in an inoperable configuration 38 where the collapsible assembly 12 is stowed beneath the seat 8, and the generally substantially horizontal position 31 of seat 8 does not typically allow a user to access and deploy the collapsible assembly 12. The vehicle storage system 36 is shown in an operable configuration 40 in FIGS. 3-5, 7, 12, 13, 15, 16, and 17 where the seat 8 is typically in a generally substantially vertical position 33 when a deploying force 70 or collapsing force 160 is applied to the seat 8, and a user may deploy or collapse the collapsible assembly 12. The collapsible assembly 12 is shown in a fully-formed configuration 34 in FIGS. 1, 6, and 14.

Figure 2:
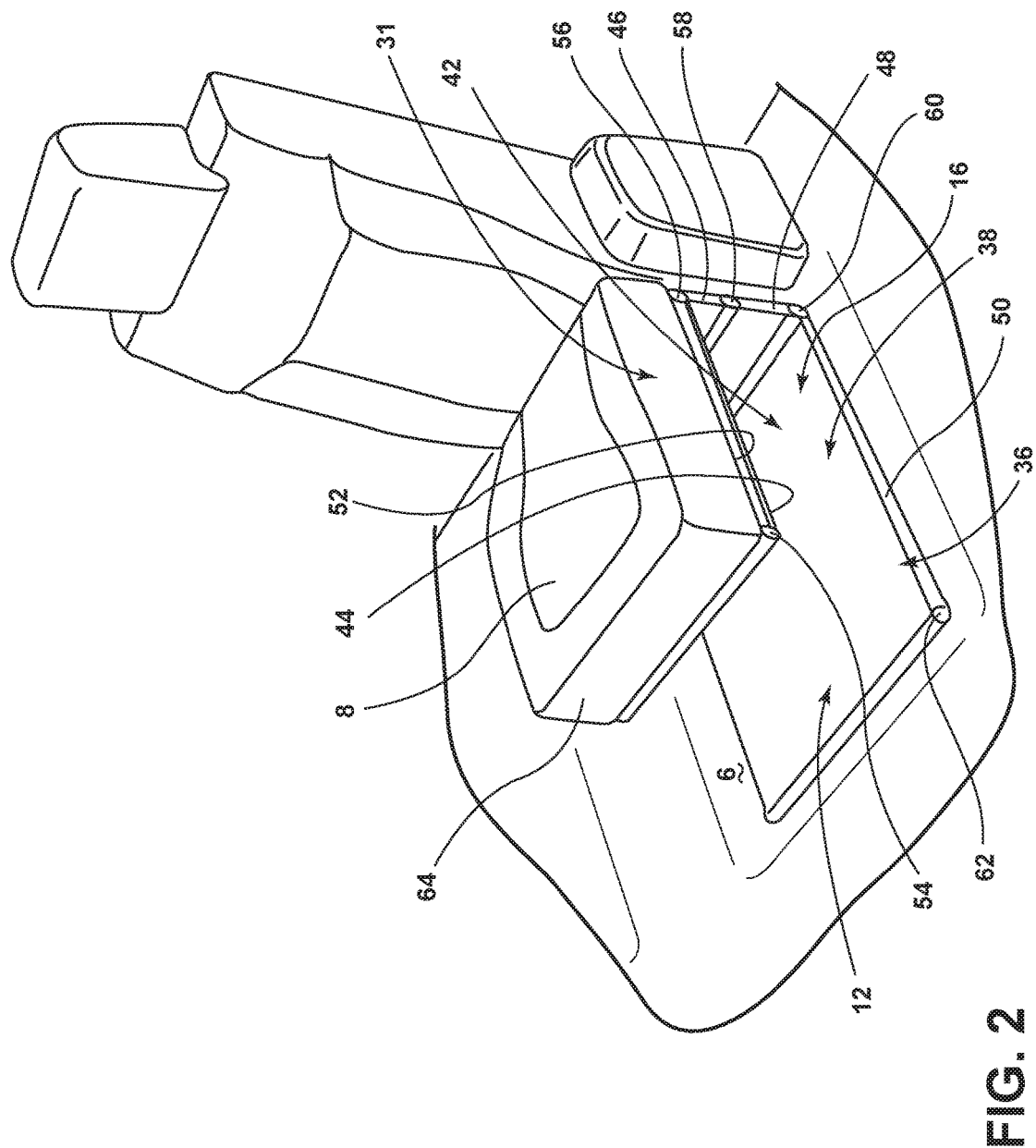
FIG. 2 is a perspective view of the collapsible assembly of FIG. 1 in a collapsed configuration stowed beneath the seat of an aspect of the present disclosure.

Referring to FIG. 2, the collapsible assembly 12 is depicted in the typically inoperable configuration 38 with the seat 8 in a substantially horizontal position 31. The collapsible assembly 12 includes a linkage system 42. The linkage system 42 includes a first panel 44, a second panel 46, a third panel 48, and a fourth panel 50. Referring to FIG. 2, the first panel 44 is adjacent the bottom 52 of the seat 8, the second panel 46 is oriented vertically below the seat 8, the third panel 48 is oriented vertically below the seat 8, and the fourth panel 50 is oriented horizontally adjacent to the floor 6. The linkage system 42 also includes a first hinge 54, a second hinge 56, a third hinge 58, a fourth hinge 60, and a fifth hinge 62. With reference to FIG. 2, the first hinge 54 is located proximate the front edge 64 of the seat 8, the second hinge 56 is located between the first panel 44 and the second panel 46, the third hinge 58 is located between the second panel 46 and the third panel 48, the fourth hinge 60 is located between the third panel 48 and the fourth panel 50, and the fifth hinge 62 is located between the fourth panel 50 and the floor 6.

Figure 3:
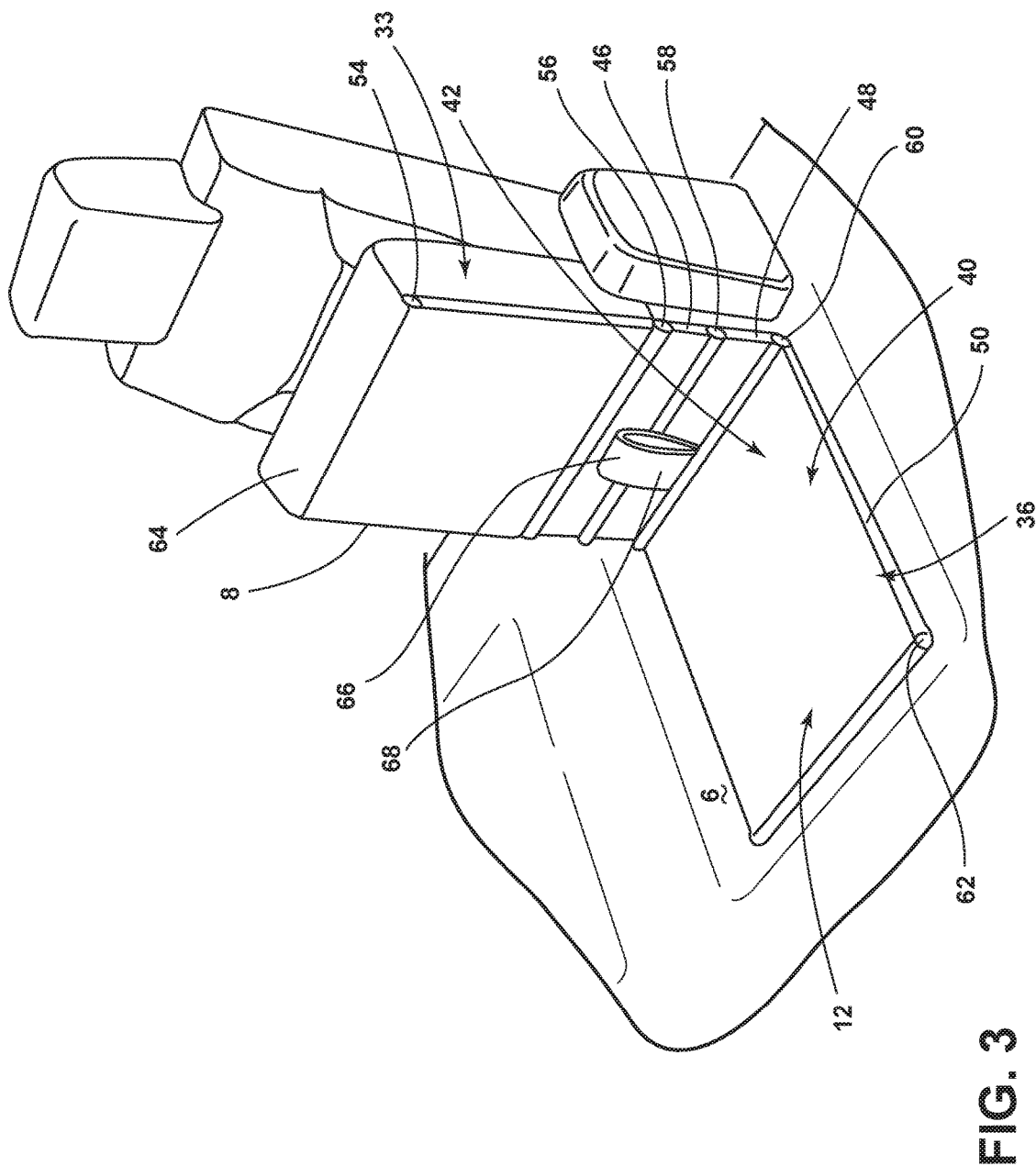
FIG. 3 is a perspective view of the collapsible assembly of FIG. 2 in a collapsed configuration with the seat in an upright position and the storage system in an operable state of an aspect of the present disclosure.

Referring to FIG. 3, the seat 8 is shown in a substantially vertical position 33. A user may conveniently access the actuator 66. The actuator 66 is selectively operable to deploy the collapsible assembly 12. In the depicted aspect, the actuator 66 is a strap 68.

Figure 4:
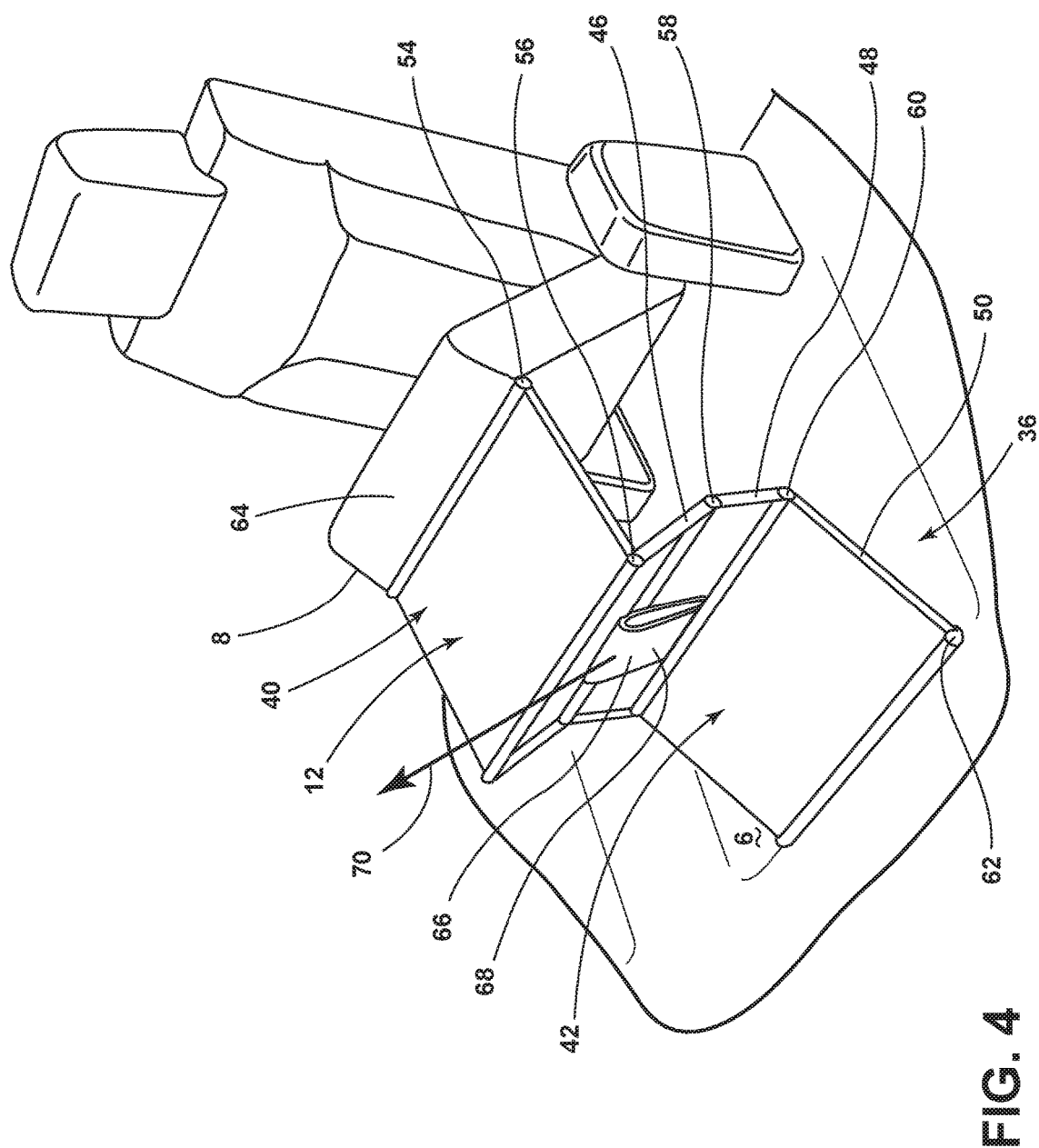
FIG. 4 is a perspective view of the collapsible assembly of FIG. 3 being expanded to a cargo storage configuration of an aspect of the present disclosure.

Referring to FIG. 4, the collapsible assembly 12 is being deployed via exertion of a deploying force 70 on the collapsible assembly 12 at the strap 68. In various aspects of the disclosure, the seat 8 may be in a substantially vertical position 33 or in a position between a substantially vertical position 33 and a substantially horizontal position 31 during deployment. In various aspects of the disclosure, the seat 8 may be fixed in a substantially vertical position 33 during deployment.

Figure 5:
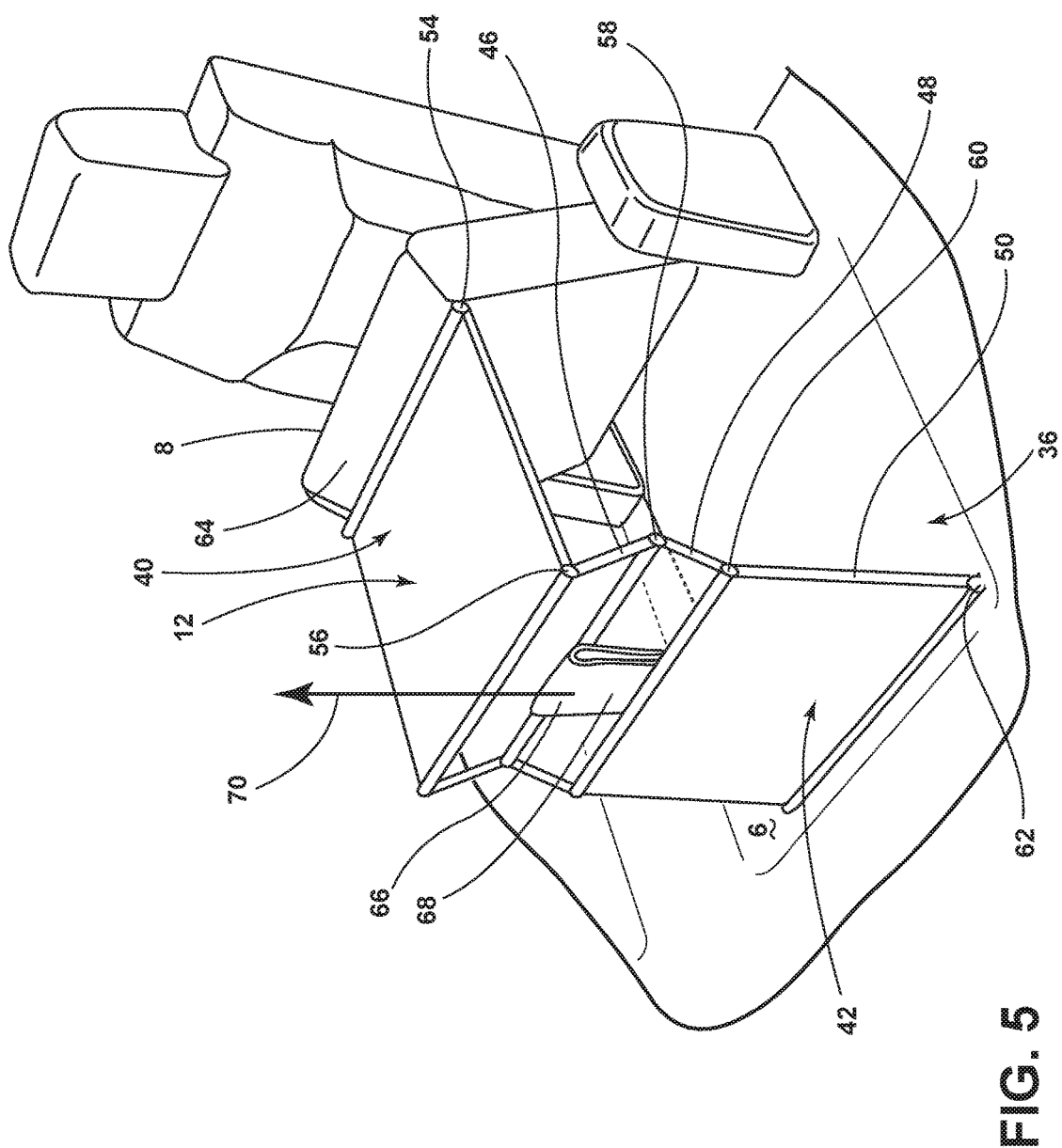
FIG. 5 is a perspective view of the collapsible assembly of FIG. 4 being further expanded to a cargo storage configuration of an aspect of the present disclosure.

Referring to FIG. 5, the collapsible assembly 12 is shown in a further deployed state. A deploying force 70 continues to be deployed on the strap 68 to deploy the collapsible assembly 12 towards a fully-formed configuration 34 seen in FIGS. 1, 6, and 14.

Referring to FIG. 6, the collapsible assembly 12 is shown in the fully-formed configuration 34. In the depicted aspect, the fully-formed configuration 34 is a rigid enclosure 20. Luggage 72 is shown in the rigid enclosure 20. An adjacent vehicle seat 26 and the driver's side passenger door 24 further define the rigid enclosure 20 and prevent items such as luggage 72 from sliding out of the rigid enclosure 20 in a sideways manner. The collapsible assembly 12 is cuboidal in the fully-formed configuration 34. The seat 8 is in an upright or substantially vertical position 33.

Figure 7:
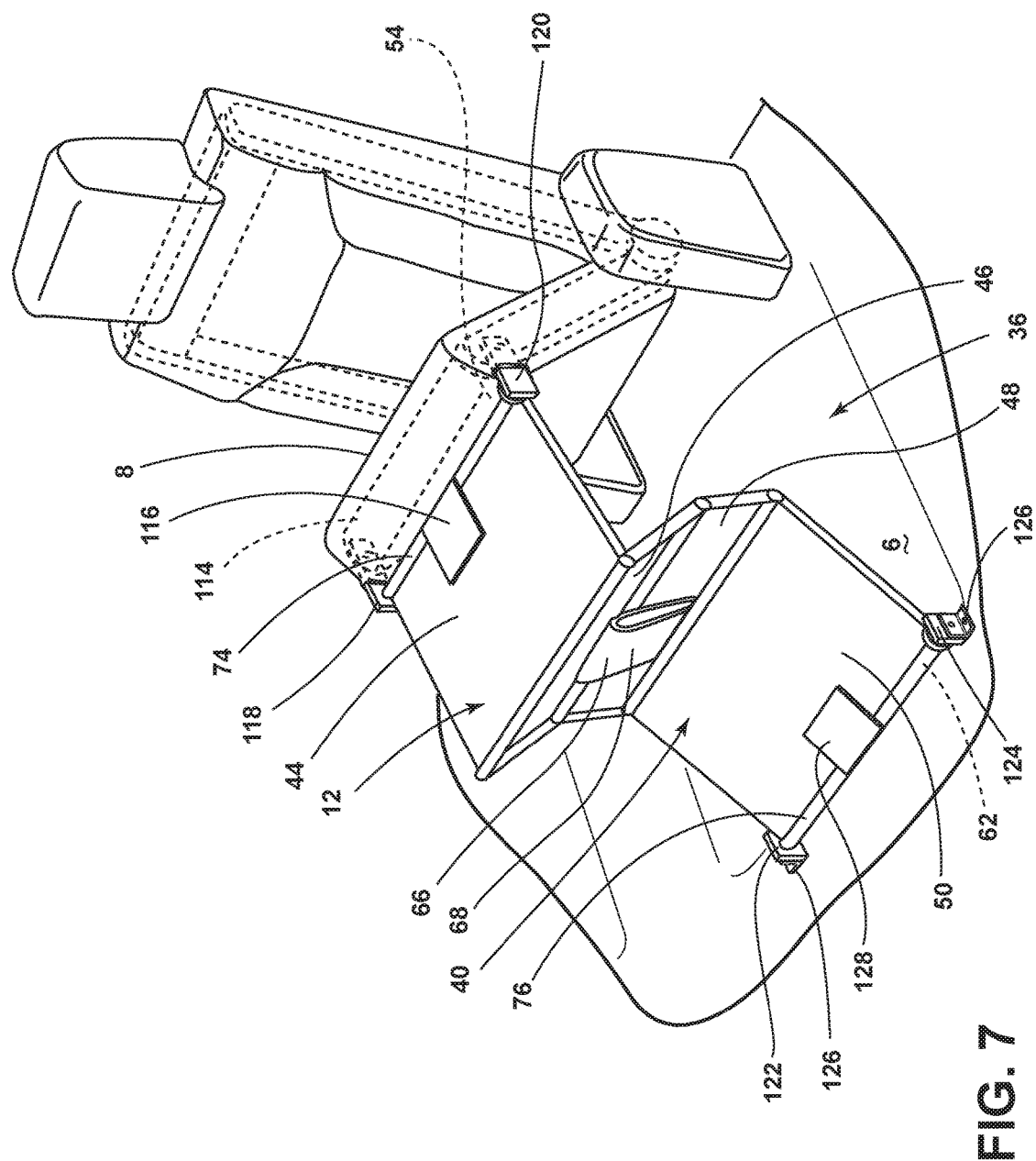
FIG. 7 is a perspective view of an aspect of the collapsible assembly in a near fully-formed configuration with torque rods of an aspect of the present disclosure.

Referring to FIG. 7, in one aspect of the disclosure seat torque rod 74 may be proximate first hinge 54, and floor torque rod 76 may be proximate fifth hinge 62. With reference to FIGS. 2 and 7, in various aspects, the seat torque rod 74 and the floor torque rod 76 are pretensioned to aid in collapsing the collapsible assembly 12 beneath the seat 8 in a substantially horizontal position 31 in the inoperable configuration 38. Referring again to FIGS. 2 and 7, the seat torque rod 74 is pretensioned so that it has approximately 25° of pretensioned rotation about first hinge 54 and towards the collapsed configuration 16 when it is stored below seat 8 in a substantially horizontal position 31 in the inoperable configuration 38. When the collapsible assembly 12 is in the fully-formed configuration 34, then the seat torque rod 74 has approximately 90° of pretensioned rotation about the first hinge 54 and towards the collapsed configuration 16. The floor torque rod 76 is pretensioned so that it has approximately 25° of pretensioned rotation about fifth hinge 62 and towards the collapsed configuration 16 when the collapsible assembly 12 is stored below the seat 8 in a substantially horizontal position 31 in the inoperable configuration 38. When the collapsible assembly 12 is in the fully-formed configuration 34, then the floor torque rod 76 has approximately 90° of pretensioned rotation about fifth hinge 62 and towards the collapsed configuration 16. In various aspects, other pretensioned force amounts are also possible.

Figure 8:
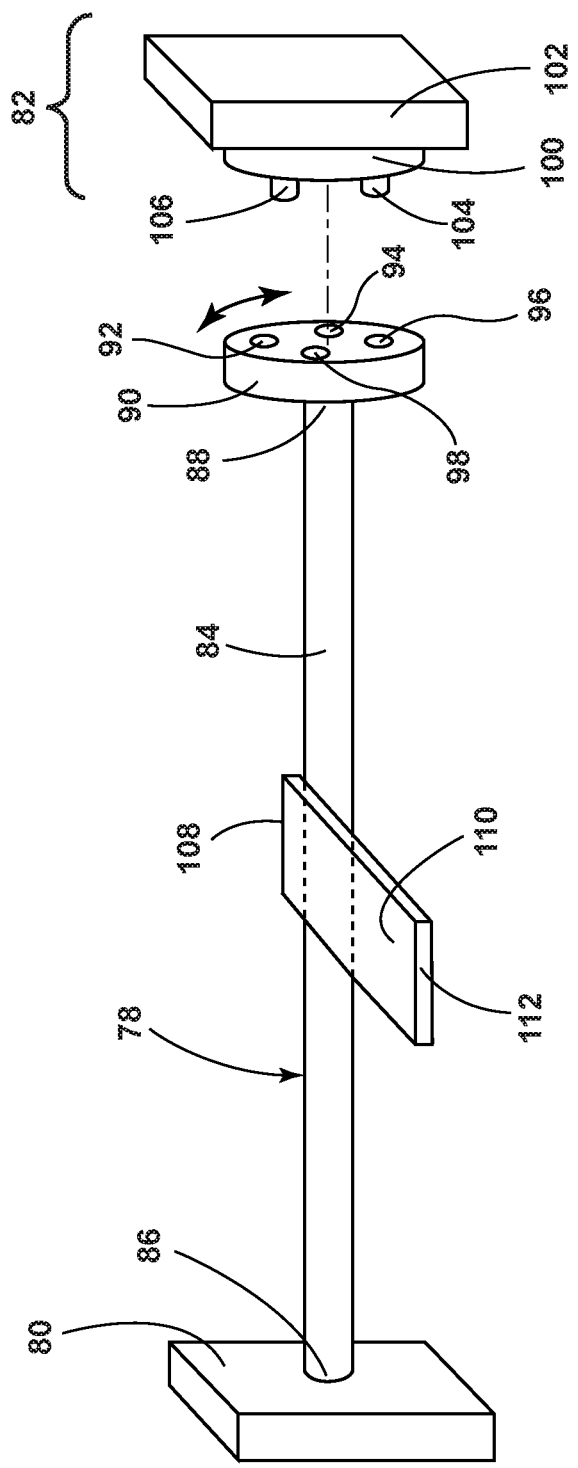
FIG. 8 is a exploded view of the torque rod with first retainer and second retainer of FIG. 7.
Figure 11:
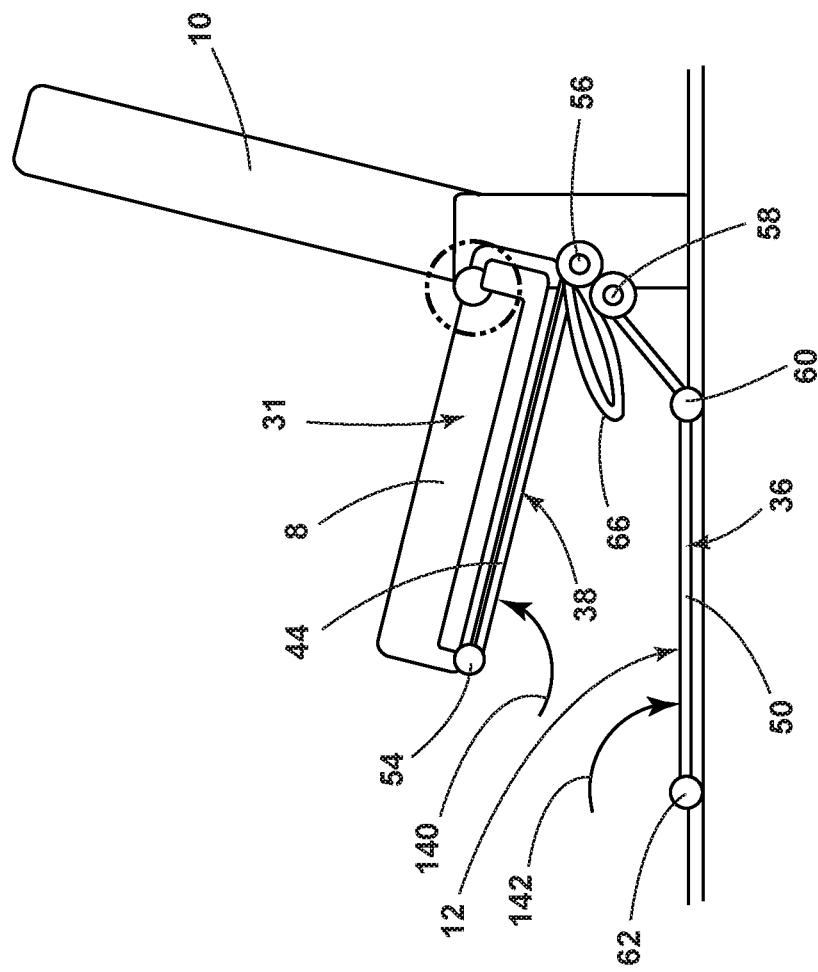
FIG. 11 is a schematic sectional view of the collapsible assembly of FIG. 9 and the seat moving from horizontal to an upright position of an aspect of the present disclosure.

Referring to FIG. 8, torque rod 78 extends between first retainer 80 and second retainer 82 and is operably coupled therewith. Torque rod 78 includes an elongated member 84 with a first end 86 and a second end 88 fixedly coupled with a first disc 90. First disc 90 includes first aperture 92, second aperture 94, third aperture 96, and fourth aperture 98. In the depicted aspect, the first end 86 of the elongated member 84 is fixedly coupled to the first retainer 80. The second retainer 82 includes second disc 100, second plate 102, first detent 104, and second detent 106. The first aperture 92, second aperture 94, third aperture 96, and fourth aperture 98 in the first disc 90 are configured to selectively engage the spring-loaded, rounded-top first detent 104 and the spring-loaded, rounded-top second detent 106 protruding from the second disc 100. The second disc 100 and the second plate 102 are fixedly coupled to one another.

Torque rod 78 includes an intermediate portion 108 having an engagement feature 110.

In the depicted aspect, the engagement feature 110 is a plate 112. In the depicted aspect, the plate 112 is a metal part welded to the torque rod 78. In various aspects, the plate 112 may be selectively positioned in relation to torque rod 78 to exert forces in various directions and amounts.

Referring to FIGS. 2-8, when the collapsible assembly 12 is deployed from the inoperable configuration 38 to the operable configuration 40, the deploying force 70 that a user applies to the actuator 66 or strap 68 overrides the preloaded torsional forces towards the collapsed configuration 16 applied by the seat torque rod 74 and the floor torque rod 76.

Referring to FIG. 7, the seat torque rod 74 first retainer 118 is fixedly attached to the seat frame 114. The seat torque rod 74 second retainer 120 is also fixedly attached to the seat frame 114. The seat torque rod 74 is attached to the first panel 44. The seat torque rod plate 116 is attached to the first panel 44.

The floor torque rod 76 first retainer 122 is fixedly attached to a floor bracket 126. The floor torque rod 76 second retainer 124 is also fixedly attached to a floor bracket 126. The floor torque rod 76 is attached to the fourth panel 50. The floor torque rod plate 128 is attached to the fourth panel 50.

Referring to FIG. 8, the first detent 104 and second detent 106 are typically in opposing apertures, such as the second aperture 94 and fourth aperture 98, when the collapsible assembly 12 is in the fully-formed configuration 34. The first detent 104 and the second detent 106 are typically in first aperture 92 and third aperture 96 when the collapsible assembly 12 is in the inoperable configuration 38. Other detent and aperture configurations are also possible.

In various aspects, tensioning mechanisms other than, or in addition to, torque rods, retainers, detents, and apertures may be used to fix the collapsible assembly 12 in various configurations and/or to provide bias to the collapsible assembly 12. Such means may include ratchets, clock springs, pawls, leaf springs, or a combination therefor or any similar retaining mechanisms.

Referring now to FIGS. 9-18, schematic side views of the collapsible assembly 12 coupled to the floor 6 and seating assembly 4 are shown. The seating assembly 4 is comprised of a seat 8 and a seatback 10 that are joined at pivot 32. The pedestal 28 couples the seating assembly 4 to the floor 6. In various aspects, the pedestal 28 may or may not be part of the seating assembly 4. In the depicted aspect, the collapsible assembly 12 is comprised of the linkage system 42. As previously explained with regard to FIGS. 1-7, the linkage system 42 is comprised of a first panel 44, a second panel 46, a third panel 48, and a fourth panel 50. The linkage system 42 is further comprised of a first hinge 54, a second hinge 56, a third hinge 58, a fourth hinge 60, and a fifth hinge 62. In the depicted aspect, an actuator 66 is used to deploy the collapsible assembly 12. The collapsible assembly 12 in FIG. 9 is in the inoperable configuration 38 where the collapsible assembly 12 is stowed beneath the seat 8 in the substantially horizontal position 31. The substantially horizontal position 31 of the seat 8 typically does not allow a user to access and deploy the collapsible assembly 12.

FIG. 10 depicts the interface 144 between the second panel 46 and the third panel 48. The third hinge 58 is between the second panel 46 and the third panel 48. Second panel 46 and third panel 48 are hinged together to form a three link chain 145 with second hinge 56, second panel 46, third hinge 58, third panel 48, and fourth hinge 60. In the depicted aspect, the three link chain 145 allows the collapsible assembly 12 to be deployed without the first panel 44 and the fourth panel 50 coming into contact with one another. In this manner, the collapsible assembly 12 can operate smoothly and substantially without collision between the various panels. The three link chain also allows for a greater length of the first and fourth panels 44 and 50, respectively. Accordingly, the collapsible assembly 12 can have a greater volume in the cargo storage configuration 18.

Figure 12:
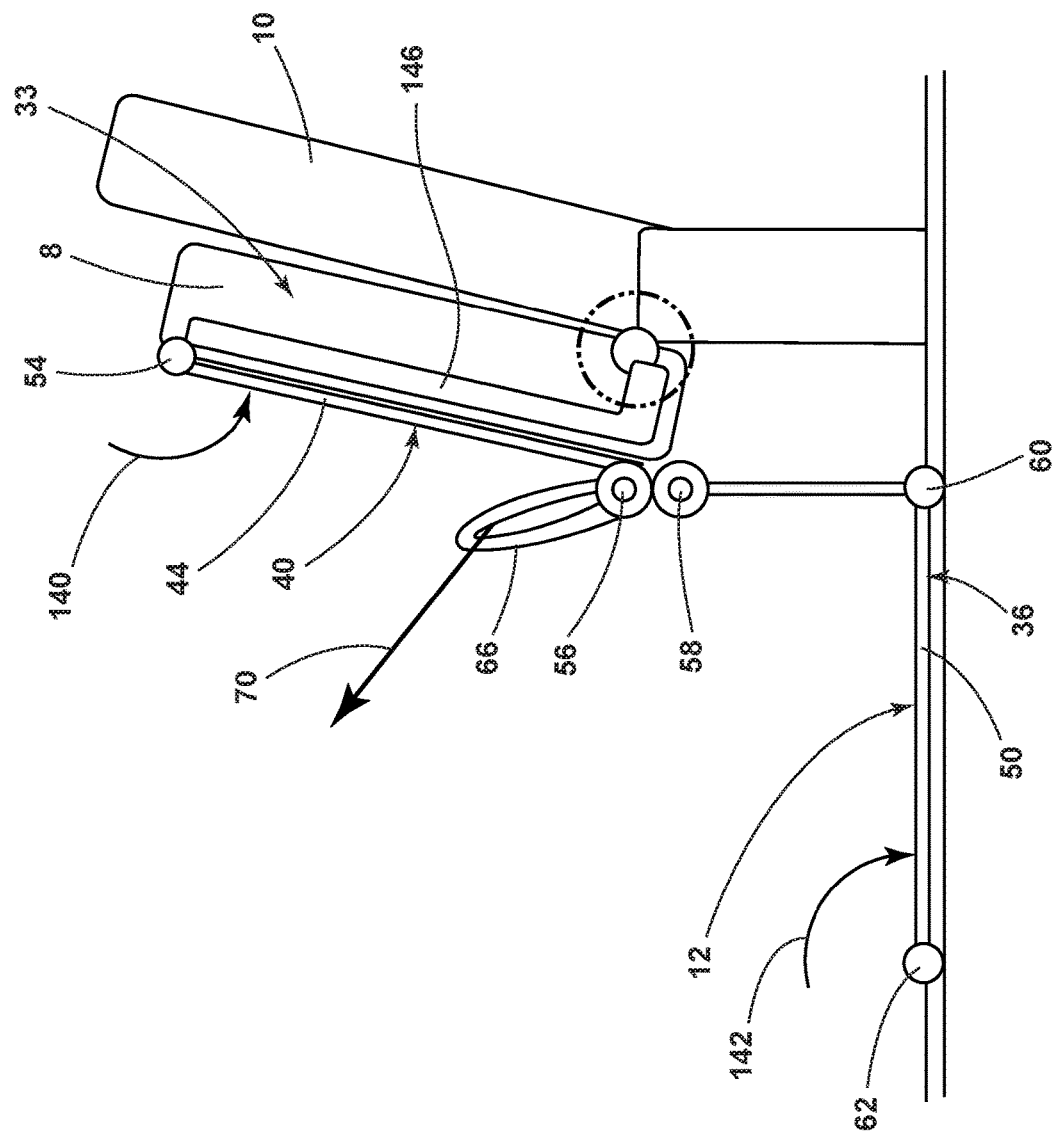
FIG. 12 is a schematic sectional view of the collapsible assembly of FIG. 11 with the seat in an upright position with a deploying force being applied of an aspect of the present disclosure.

With reference to FIGS. 9-18, as a user starts to lift the seat 8 from a substantially horizontal position 31 to a substantially vertical position 33, a force shown by arrow 140 near the first panel 44 biases the first panel 44 towards a collapsed configuration 16. A force shown by arrow 142 near the fourth panel 50 biases the fourth panel 50 towards a collapsed configuration 16. As previously shown and discussed, in various aspects, a seat torque rod 74 may be proximate the first hinge 54 and a floor torque rod 76 may be proximate the fifth hinge 62. The seat torque rod 74 is selectively and fixedly coupled to the seat second retainer 120 to maintain the collapsible assembly 12 in a fully-formed configuration 34 or a collapsed inoperable configuration 38. The floor torque rod 76 is selectively and fixedly coupled to the floor second retainer 124 to maintain the collapsible assembly 12 in a fully-formed configuration 34 or a collapsed inoperable configuration 38. With reference to FIG. 12, a deploying force 70 is applied by the user via an actuator 66 to the collapsible assembly 12 and against the loaded seat torque rod 74 and the loaded floor torque rod 76 to deploy the collapsible assembly 12.

Figure 13:
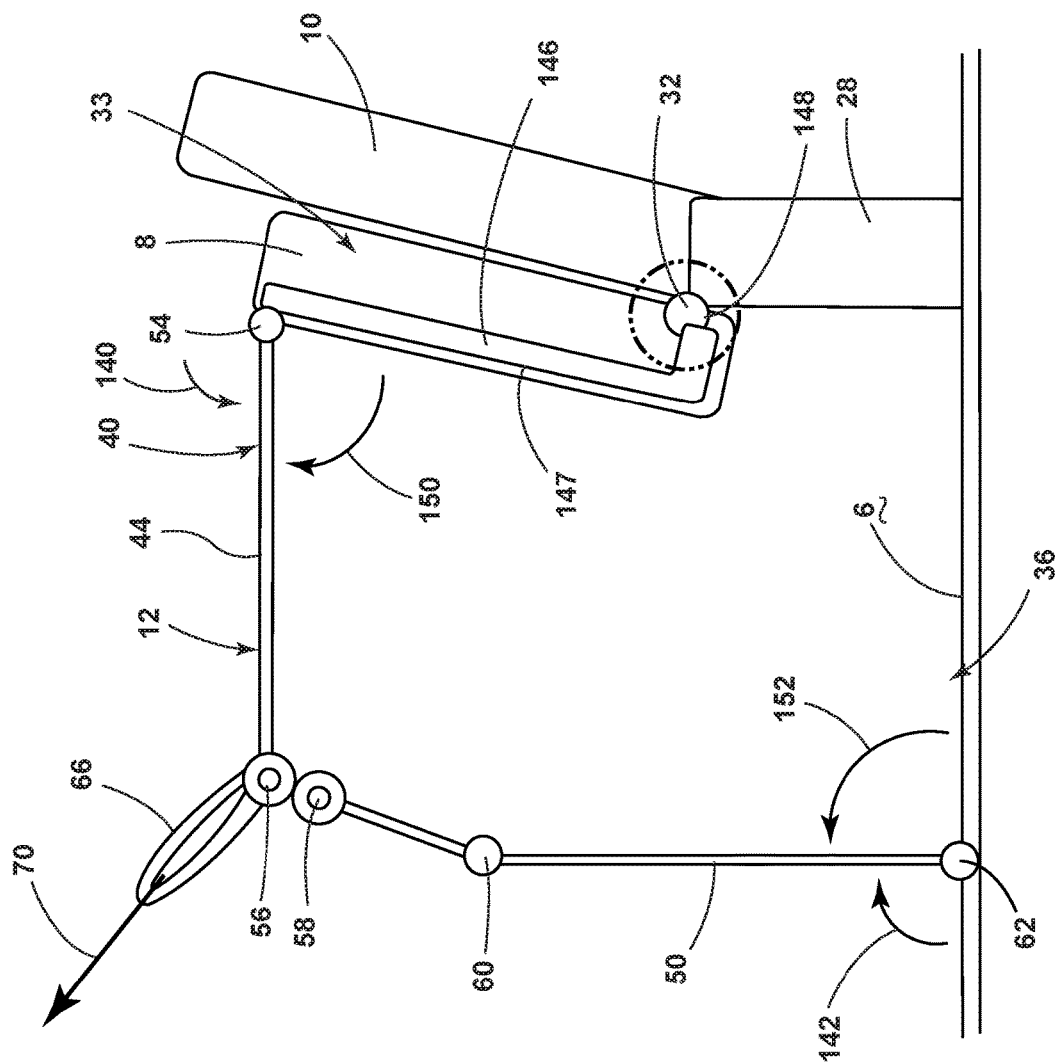
FIG. 13 is a schematic sectional view of the collapsible assembly of FIG. 12 with the seat in an upright position with the collapsible assembly in a near fully-formed configuration of an aspect of the present disclosure.

Referring now to FIG. 12, the seat 8 is shown in the upright or substantially vertical position 33. The forces acting on the first panel 44 and the fourth panel 50 are shown at arrows 140 and 142, exerted by loaded seat torque rod 74 and loaded floor torque rod 76, respectively. In the depicted aspect, a user exerts the deploying force 70 on the actuator 66, which is a strap 68 in the depicted aspect. In various aspects, the seat pan 146 may be a part of the seat frame 114. In various aspects, the seat pan 146 may not be a part of the seat frame 114. With reference to FIG. 13, in various aspects, when the first panel 44 rotates away from a seat pan underside 147, and about the first hinge 54, a locking recliner mechanism 148 may move into a locked condition to secure the seat 8 in a substantially vertical position 33. In various aspects, the locking recliner mechanism 148 may not be utilized.

Figure 14:
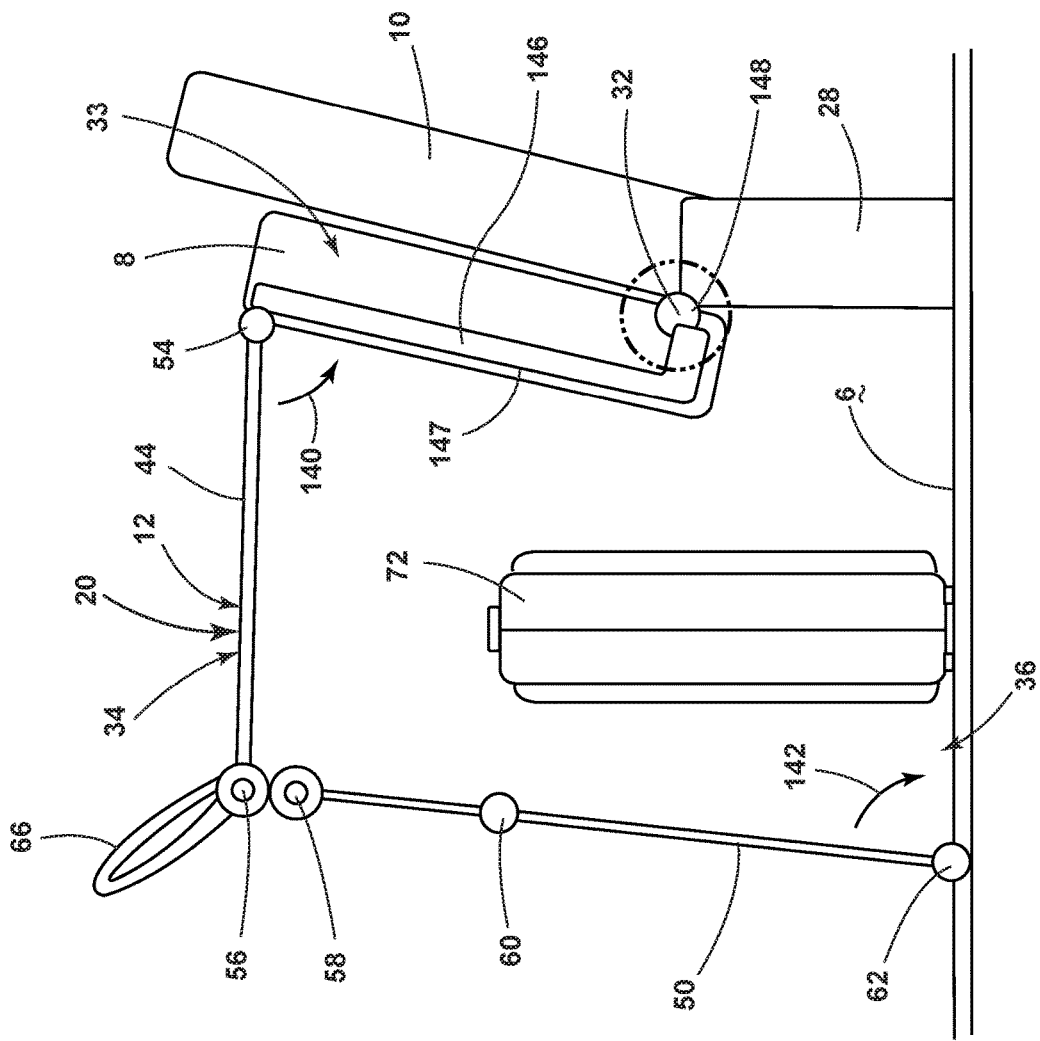
FIG. 14 is a schematic sectional view of the collapsible assembly of FIG. 13 with the seat in an upright position with the collapsible assembly in a fully-formed configuration.

Referring to FIG. 13, the collapsible assembly 12 is shown in an almost fully-formed configuration. The first panel 44 and the fourth panel 50 are now rotating about respective first hinge 54 and fifth hinge 62 with forces shown by arrows 150 and 152 acting about first hinge 54 and fifth hinge 62. In various aspects, forces shown at arrows 140 and 142 returning the collapsible assembly 12 to the collapsed configuration 16 are present from the preloaded seat torque rod 74 and floor torque rod 76, respectively. With reference to FIGS. 13-14, the deploying force 70 aids in achieving the fully-formed configuration 34.

With regard to FIG. 14 the collapsible assembly 12 is shown in the fully-formed configuration 34. The rigid enclosure 20 is self-standing and may be used to store luggage 72.

Figure 15:
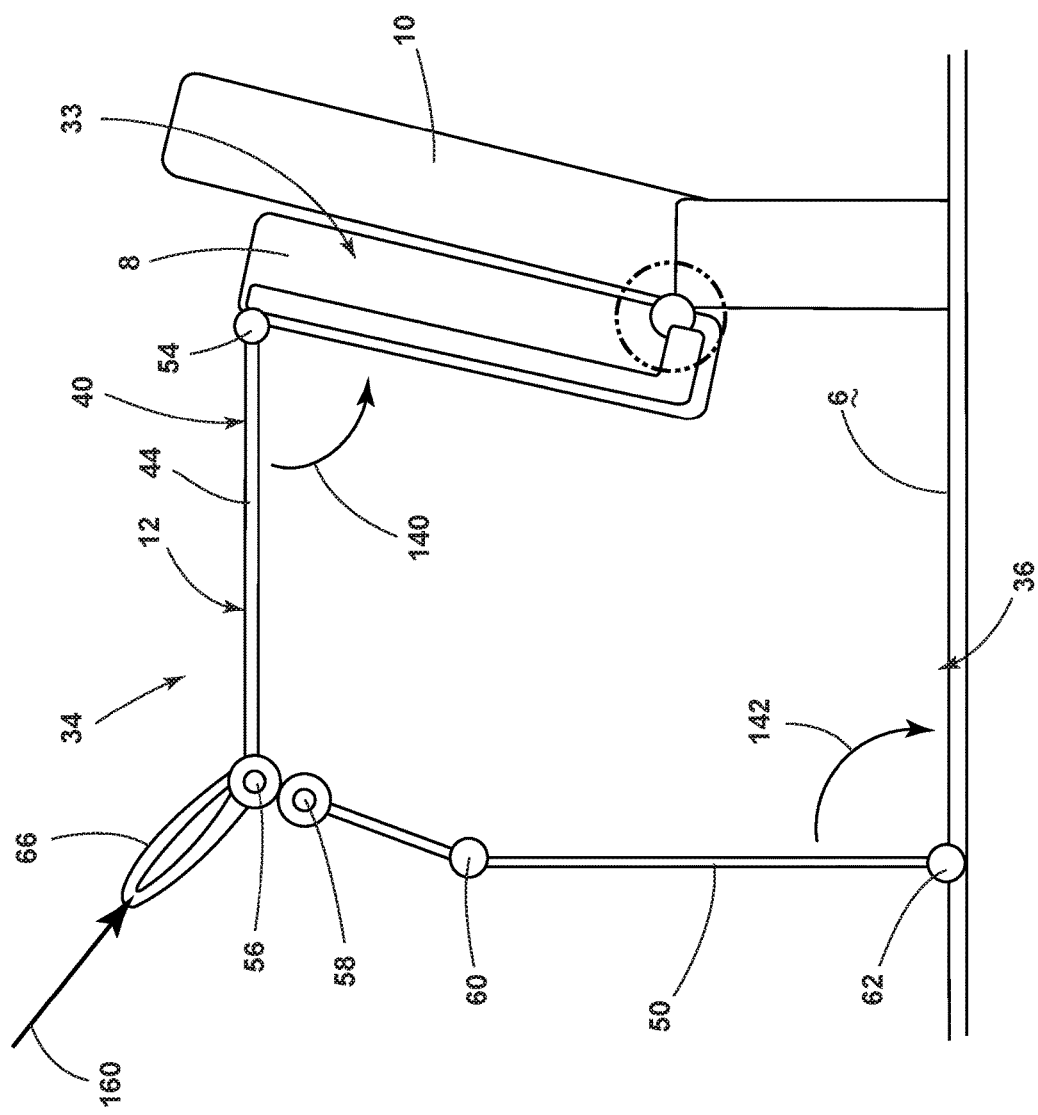
FIG. 15 is a schematic sectional view of the collapsible assembly of FIG. 14 with the seat in an upright position with a collapsing force being applied of an aspect of the present disclosure.

Referring to FIG. 15, a user applies collapsing force 160 to the collapsible assembly 12. The preloaded force shown at arrow 140 and the preloaded force shown at arrow 142 are collapsing the collapsible assembly 12. In various aspects, the preloaded force shown at arrow 140 may be from the pretensioned seat torque rod 74, and the preloaded force shown at arrow 142 may be from the pretensioned floor torque rod 76.

Figure 16:
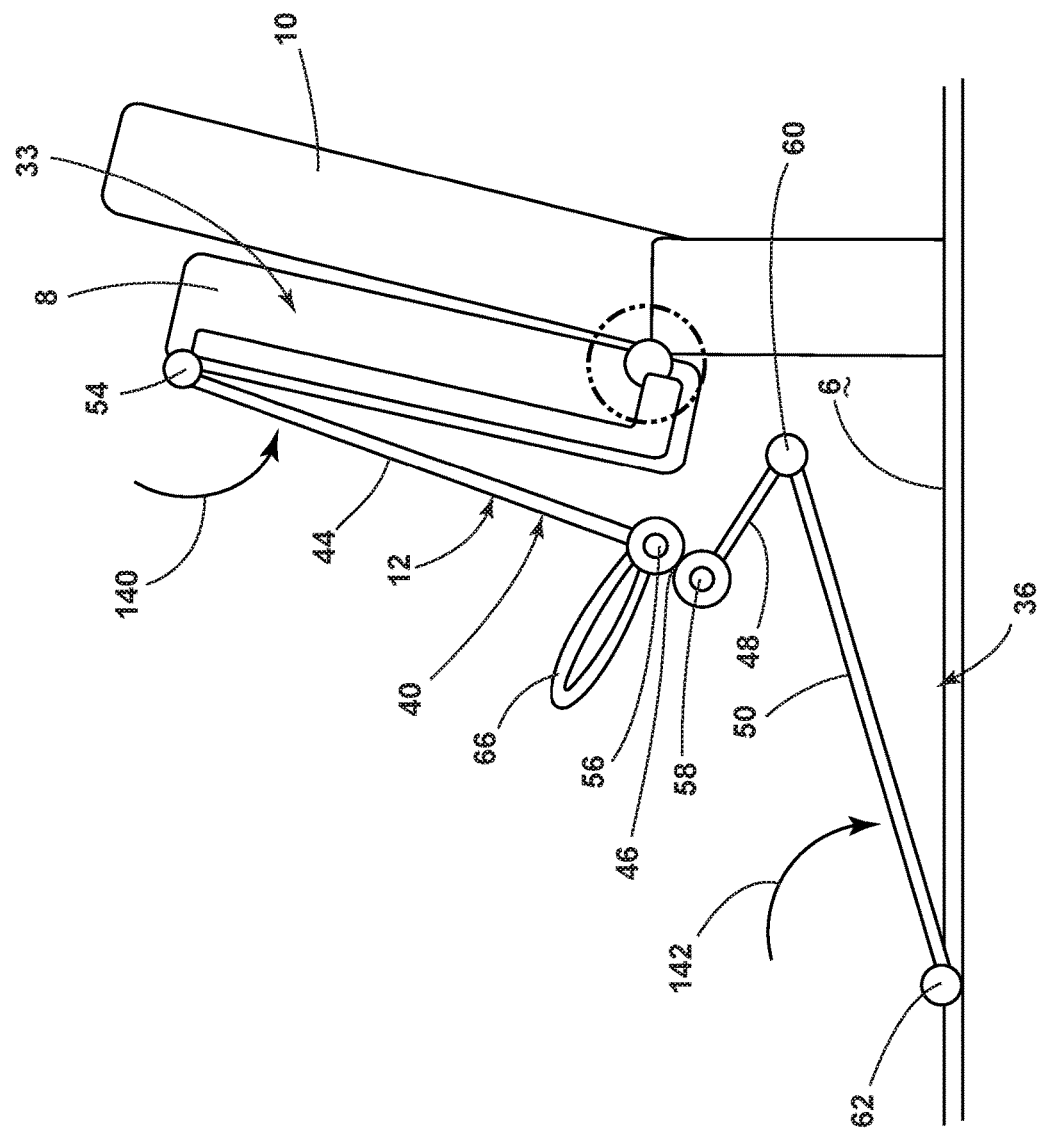
FIG. 16 is a schematic sectional view of the collapsible assembly of FIG. 15 with the seat in an upright position and a further collapsing force being applied of an aspect of the present disclosure.

FIG. 16 shows further collapsing of the collapsible assembly 12. Preloaded forces at arrows 140 and 142 act to collapse the collapsible assembly 12. In various aspects, preloaded seat torque rod 74 and preloaded floor torque rod 76, as shown and described at FIGS. 7-8, aid in collapsing the collapsible assembly 12.

Figure 17:
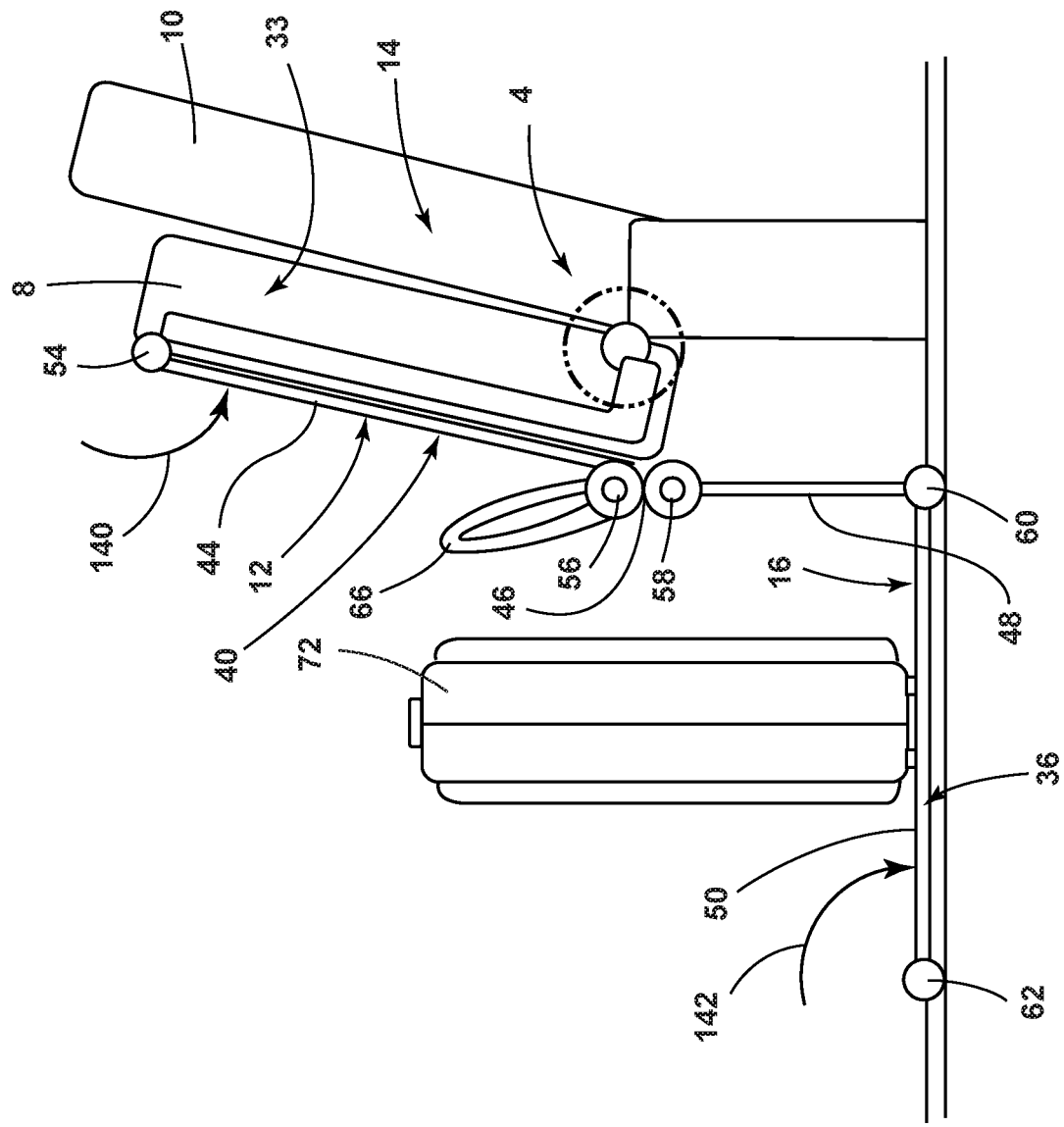
FIG. 17 is a schematic sectional view of the collapsible assembly of FIG. 16 with the seat in an upright position and a further collapsing force being applied of an aspect of the present disclosure.

Referring now to FIG. 17, the collapsible assembly 12 is shown in a collapsed configuration 16. Referring to FIGS. 7, 8, and 17, in various aspects, arrows 140 and 142 depict forces present in the seat torque rod 74 and the floor torque rod 76, respectively. Referring to FIG. 17, the seating assembly 4 is in the stadium position 14. Luggage 72 may be stored in the space proximate the seat 8 in the substantially vertical position 33 and atop and adjacent to the collapsible assembly's 12 fourth panel 50, third panel 48, second panel 46, and first panel 44.

Figure 18:
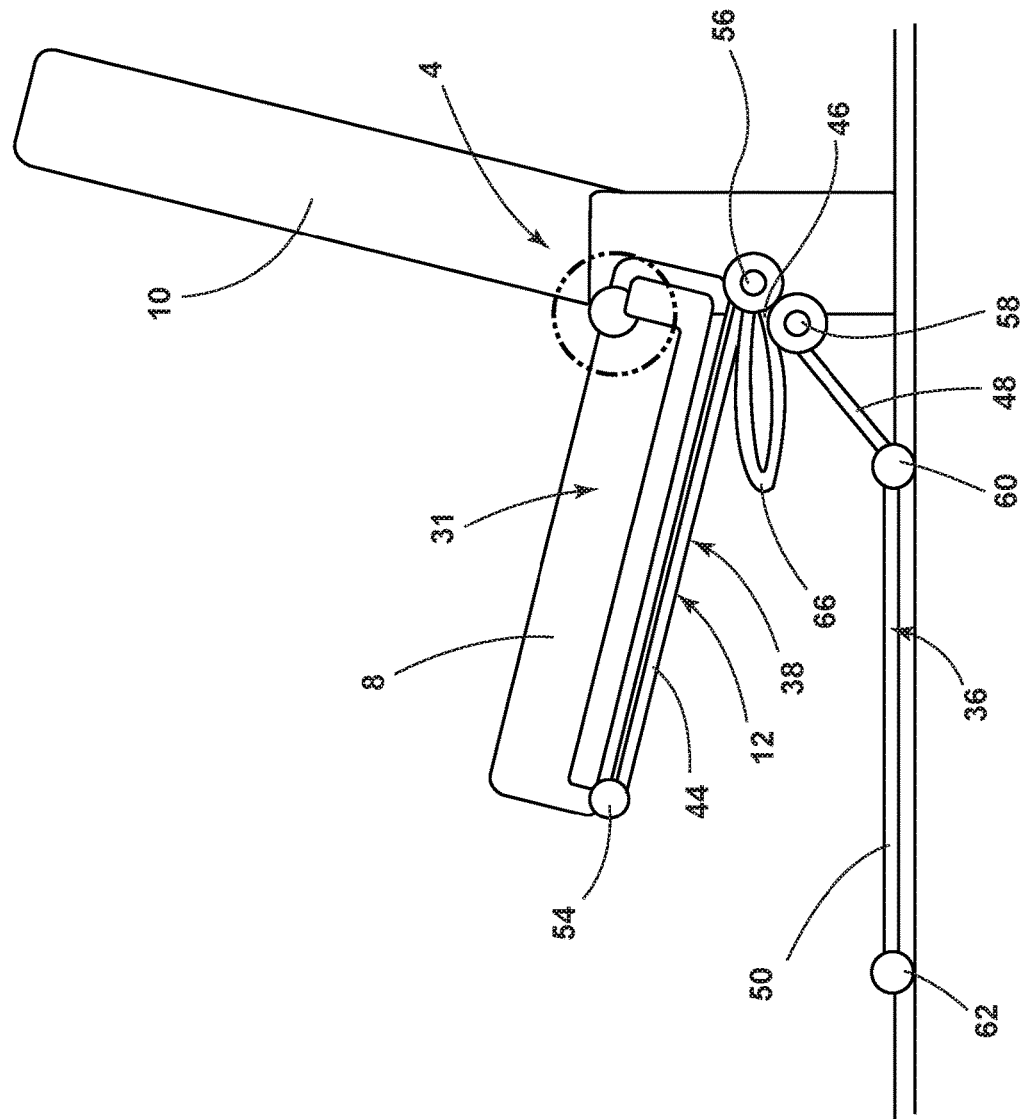
FIG. 18 is a schematic sectional view of the collapsible assembly of FIG. 17 in a stowable position beneath the seat when the seat is in a horizontal orientation of an aspect of the present disclosure.

Referring to FIGS. 17-18, in various aspects, seat 8 is lowered from a substantially vertical position 33 to a substantially horizontal position 31 so that second panel 46 and third panel 48 lay at a rearward angle beneath the seat 8. FIG. 18 depicts the collapsible assembly 12 under seat 8 in the substantially horizontal position 31.

Figure 19:
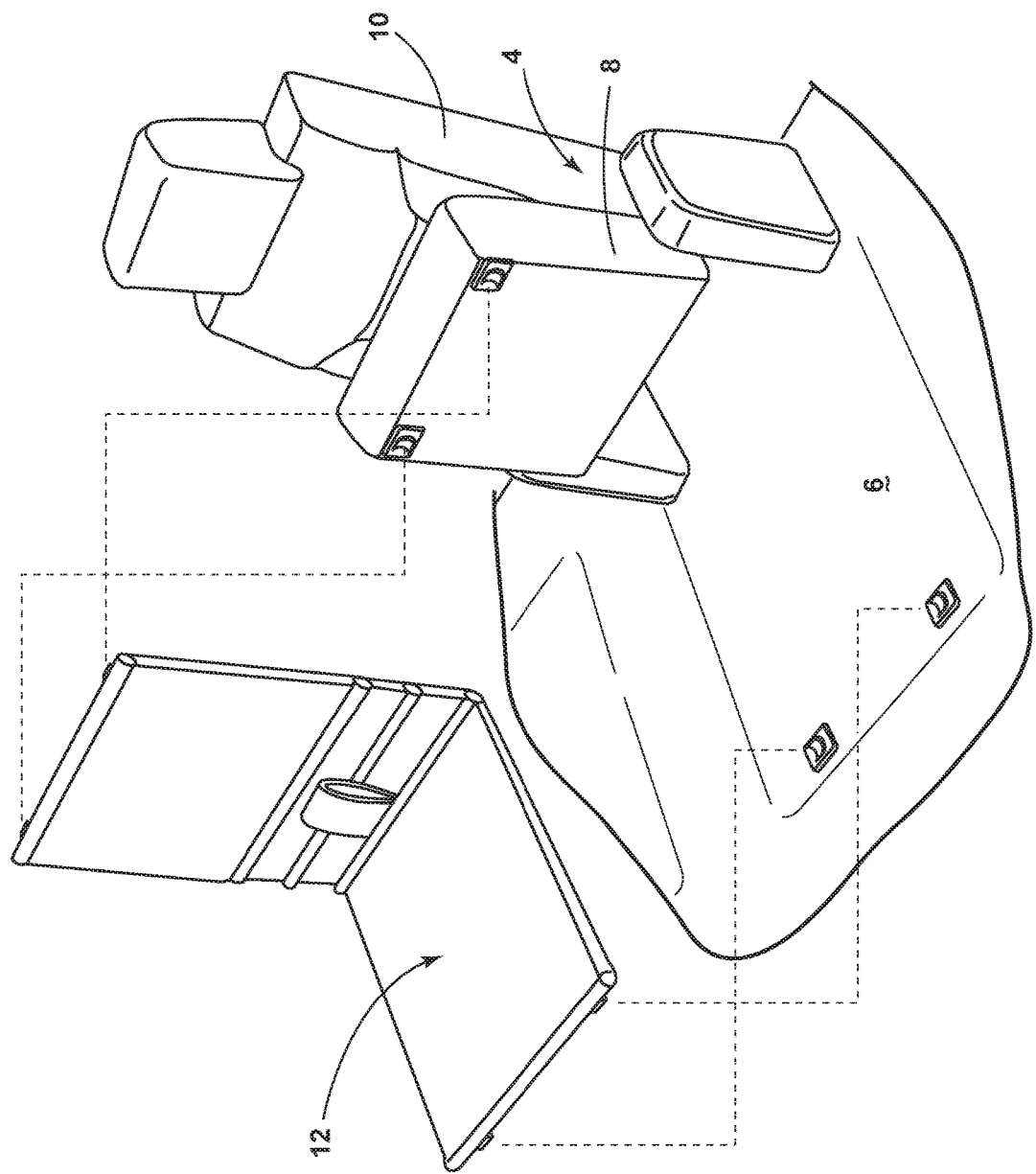
FIG. 19 is a perspective view of the collapsible assembly detached from the floor and the seat of an aspect of the present disclosure.

Referring to FIG. 19, in various aspects of the present disclosure, the collapsible assembly 12 may be detached from the seat 8 and the floor 6. The collapsible assembly 12 may be removed from the vehicle 2.

In various aspects, the collapsible assembly 12 may be used in an autonomous vehicle or another type of vehicle. In various aspects, the collapsible assembly 12 and variations thereof may be used for mass transit, fleet, and other larger occupant vehicles. The seating assembly 4 can be part of a single seat for a single passenger, a bench seat for multiple passengers, a seat in the front row, a seat in the back row, or any other vehicle seat. The seating assembly 4 may be oriented in a forward facing, rearward facing, sideways facing, or other orientation within the vehicle.

In various aspects of the disclosure, the term actuator may include manual actuation by a user, automated actuation by activation by a signal from a button, a remote control, a wireless device, a voice command and the like.

In various aspects of the disclosure, the linkage system of the collapsible assembly may vary due to the size of the panels and the locations of the hinges. In various aspects of the disclosure, the linkage system of the collapsible assembly may have varying numbers of panels and hinges.

A variety of advantages may be derived from the use of the present disclosure. A user is able to effectively utilize space in a vehicle. When the seat is in a horizontal position, the user is able to sit comfortably. When the seat is raised to a substantially vertical position, the user may free space for cargo storage. The collapsible assembly may be deployed to form an enclosure to store luggage so that luggage remains in one place during erratic driving or a collision. The collapsible assembly may be deployed to provide a space to place luggage so that it is out of sight. The collapsible assembly is easily transformed from a collapsed, inoperable configuration to a fully-formed configuration. The collapsible assembly does not interfere with the user's use of the seat when it is in the inoperable, collapsed configuration below the horizontal seat.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle comprising:
a seating assembly attached to a floor having a seat that is rotationally operable relative to a seatback; and
a collapsible assembly attached to the floor and the seat, wherein when the seat is pivoted upright to a substantially vertical position the collapsible assembly is selectively deployable from a collapsed configuration to a cargo storage configuration that defines a rigid enclosure at least partially defined by the seat and the floor, and wherein the collapsible assembly includes a linkage system connected between the floor and the seat in the collapsed configuration and the cargo storage configuration.

2. The vehicle of claim 1:
wherein the collapsible assembly is selectively collapsible from the cargo storage configuration to the collapsed configuration.

3. The vehicle of claim 1 wherein the rigid enclosure is cuboidal.

4. The vehicle of claim 1 wherein the rigid enclosure is further defined by at least one of a vehicle door and an adjacent vehicle seat.

5. The vehicle of claim 1 wherein the rigid enclosure is accessible via a vehicle door.

6. The vehicle of claim 1 wherein the linkage system includes a plurality of panel members.

7. The vehicle of claim 1 wherein when the seat is pivoted substantially horizontally in a seating position, at least a portion of the collapsible assembly is stowable between the seat and the floor.

8. The vehicle of claim 1 wherein the collapsible assembly is selectively detachable from the seat and the floor.

9. The vehicle of claim 1 further comprising an actuator for at least one of deploying and collapsing the collapsible assembly, wherein the actuator is disposed between a hinge of the linkage system disposed proximate the seat and a hinge of the linkage system disposed proximate the floor.

10. The vehicle of claim 1 wherein the deploying of the collapsible assembly is biased toward the collapsed configuration by a first biasing mechanism disposed adjacent to the seat and by a second biasing mechanism disposed adjacent to the floor.

11. The vehicle of claim 1 further comprising detents that maintain the collapsible assembly in the cargo storage configuration, wherein the detents are disposed in a biasing mechanism disposed near at least one of a front portion of the seat and the floor.

12. A seating assembly comprising:
a seat and a seatback coupled to a floor; and
a collapsible assembly coupled to the seat and the floor selectively deployable from a collapsed configuration to a cargo storage configuration defining an enclosure at least partially defined by the seat and the floor and comprising a linkage system connected between the seat and the floor in the collapsed configuration and in the cargo storage configuration, wherein the linkage system includes a panel and a hinge located between the panel and the floor and wherein the panel is rotatable about the hinge between a substantially horizontal position in the collapsed configuration and a substantially vertical position in the cargo storage configuration.

13. The seating assembly of claim 12 wherein the seat is in a substantially vertical position.

14. The seating assembly of claim 12 wherein the enclosure has a cuboidal shape.

15. The seating assembly of claim 12 wherein the linkage system includes a plurality of panel members.

16. A storage system comprising:
a seating assembly coupled to a floor and comprising a seat and a seatback; and
a collapsible assembly;
wherein the storage system is selectively arrangable in at least one of: inoperable, operable, and fully-formed configurations, wherein the collapsible assembly includes a linkage connected between the floor and the seat in the inoperable, operable, and fully-formed configurations, wherein the fully-formed configuration includes the seat in a substantially vertical position and wherein the seat is rotatable towards the seatback when the collapsible assembly is deployed from the inoperable configuration to the operable configuration.

17. The storage system of claim 16 wherein an inoperable configuration includes the seat in a substantially horizontal position.

18. The storage system of claim 16 wherein the operable configuration includes the seat in a substantially vertical position.

19. The storage system of claim 16 wherein the fully-formed configuration includes an enclosure defined by at least the collapsible assembly, the seat, and the floor.

20. The storage system of claim 16 further comprising detents that maintain the fully-formed configuration, wherein the detents are disposed in a biasing mechanism proximate a hinge disposed between the linkage and the seat.

* * * * *